United States Patent [19]
Baugher et al.

[11] Patent Number: 5,388,097
[45] Date of Patent: Feb. 7, 1995

[54] SYSTEM AND METHOD FOR BANDWIDTH RESERVATION FOR MULTIMEDIA TRAFFIC IN COMMUNICATION NETWORKS

[75] Inventors: Mark J. Baugher; Daniel D. Heimsoth; Isabel B. Van Horn, all of Austin, Tex.

[73] Assignee: International Business Machines Corporation, Armonk, N.Y.

[21] Appl. No.: 85,274

[22] Filed: Jun. 29, 1993

[51] Int. Cl.⁶ ............................................. H04L 12/42
[52] U.S. Cl. ................................ 370/85.5; 370/85.6; 370/85.7; 395/325
[58] Field of Search ......................... 370/84, 85.2, 85.4, 370/85.5, 85.7, 85.15, 95.1; 371/33; 395/325; 348/7, 9, 13, 16; 455/58.1

[56] References Cited

U.S. PATENT DOCUMENTS

| | | | |
|---|---|---|---|
| 4,539,679 | 9/1985 | Bux et al. | 370/85.4 |
| 4,955,019 | 9/1990 | Mizuhara et al. | 370/85.9 |
| 4,991,079 | 2/1991 | Dann | 364/200 |
| 5,001,707 | 3/1991 | Kositpaiboon et al. | 370/85.6 |
| 5,054,022 | 10/1991 | Van Steenbrugge | 370/85.11 |
| 5,159,592 | 10/1992 | Perkins | 370/85.7 |
| 5,164,938 | 11/1992 | Jurkevich et al. | 370/60.1 |
| 5,276,682 | 1/1994 | Van As et al. | 370/85.5 |

OTHER PUBLICATIONS

"Experimental Internet Stream Protocol", Version 2 (ST-II), CIP Working Group, Oct. 1990.
"Study Group X1-Report R 133", International Telegraph and Telephone Consultative Committee, COM X1-R 133-E, Oct., 1991.
P. Zafiropulo et al, "Data/Voice Integration Based on the IEEE 802.5 Token-Ring Lan", IBM Research Report, RZ 1463, Apr. 25, 1986.
C. L. Liu et al, "Scheduling Algorithms for Multiprogramming in a Hard-Teltime Environment", Journal of the Association for Computing Machinery, vol. 20, No. 1, Jan. 1973, pp. 46–61.
D. Ferrari et al, "A Scheme for Real-time channel Establishment in Wide-Area Networks", IEEE Journal on Selected Areas in Communications, vol. 8, No. 3, Apr. 1990, 0733-8716/90/0400-0368, pp. 368-379.
D. Ferrari, "Client Requirements for Real-Time Communication Services", IEEE Communications Magazine, Nov. 1990, 0163-6804/90/0011-0065, pp. 65-72.

*Primary Examiner*—Benedict V. Safourek
*Attorney, Agent, or Firm*—Robert M. Carwell

[57] ABSTRACT

A system and method is provided to compliment use of priority for reserved traffic in multimedia computerized data communication networks, to insure that the opportunity for transmitting large, unreserved data frames is constrained. If frames transmitted when the server releases a token tend to be small, then the server will capture a larger portion of the bandwidth. Thus, a short bandwidth reservation acknowledgement is transmitted onto the ring by the client for selected frames which it receives. This is not addressed to any station on the ring. Rather it is simply transmitted at a non-zero priority less than the server's priority. The criteria which is employed by the client for such acknowledgement is that the sender will send a bandwidth reservation acknowledgement only when the IEEE 802.5 AC field is set, but will do so for a fixed amount of time or for a fixed number of received frames. This criteria provides an optimization reducing overall ring utilization, since the bandwidth reservation acknowledgement is only sent when the ring is congested. A communication network is disclosed which transmits an unsolicited acknowledgement at non-zero priority for each non-zero priority frame received, such system thereby being independent of the communication protocol employed by the network station.

20 Claims, 6 Drawing Sheets

BANDWIDTH RESERVATION ACK

FIG. 7

SYSTEM AND METHOD FOR BANDWIDTH RESERVATION FOR MULTIMEDIA TRAFFIC IN COMMUNICATION NETWORKS

FIELD OF THE INVENTION

This invention relates to data processing systems and, more particularly, to such systems providing for multimedia traffic.

BACKGROUND OF THE INVENTION

It has long been known to provide computer workstations interconnected by digital communication networks whereby users of the individual workstations may communicate with one another over the network. Previously this was common, for example, by means of a typed note, data or program file transmitted to another user. More recently, users have increasingly requested desktop conferencing, remote presentations, and other multimedia applications between network users. However, such multimedia applications have associated therewith data-intensive sound, voice, and video flows. This requires concomitant high bandwidth communication links between distributed computing systems with minimal communication delay, maximum throughput, and instantaneous burst communication capability. The requirements of such multimedia applications accordingly make scheduling appropriate resources to provide for necessary quality of service very difficult.

Prior art has recognized that certain data in a network, such as that associated with multimedia, may require priority handling. Thus, for example, a "quality of service" (QOS) has been defined in the literature, hereinafter described in more detail. This seeks to describe various parameters which may be specified in an attempt to define certain minimum requirements which must be met for transmissions of given data types over the network. See, for example, quality of service standards set forth in the Open System Interconnect Standard X.214 of the International Standards Organization interface and the quality of service standards defined in CCITT Q.931 (ISDN), Q.933 (frame relay), and Q.93B (B-ISDN ATM) drafts.

As yet another example, there is an architected priority mechanism in the IEEE 802.5 Token Ring. A station on the ring with a high priority frame to send may indicate this in an access control field of a passing frame. When a station sending the frame releases the token, it releases the token at the priority of the AC field, and eventually sets it back to its original priority as specified in an IEEE 802.5 media access control (MAC) protocol. The IEEE standard and implementations thereof merely specify a protocol for increasing and decreasing priority, but each station is unconstrained in its use of priority beyond this protocol.

Several references have addressed the problem of priority traffic management in multimedia communication network systems. For example, the International Standards Organization (ISO) and International Telephone and Telegraph Consultative Committee have specified quality of service parameters as part of the link layer interface (CCITT X.212 and ISO 8886). ISDN provides a comparable standard, Q933. These parameters include throughput, transit delay, residual error rate and resilience to faults in the physical media to describe bandwidth reservation requirements. Token ring time division multiplexing schemes for propagating priority traffic across a token ring have been discussed in U.S. Pat. No. 4,843,606, "Local Area Communications Systems for Integrated Services Based on a Token Ring Transmission Medium", by Bux et al, and U.S. Pat. No. 4,539,679, "Synchronization in a Communication Network of Interconnected Rings", also by Bux et al.

Moreover, the IEEE 802.5 priority mechanism has been proposed for voice in the token ring, and prototyping has been performed of a network layer bandwidth manager which performs bandwidth reservation on links along a path, and implements end-to-end bandwidth reservation using the Internet experimental stream protocol RFC 1190, using token ring priority.

Notwithstanding the foregoing, several problems nevertheless remain which have not been effectively addressed by the prior art in providing for bandwidth for reserved multimedia traffic. One problem relates to the emergence of heterogeneous networks from differing vendor implementations of multimedia sessions. This requires that, in providing for reserved bandwidth connections, a solution must be provided which minimizes changes to application program interfaces and underlying client implementations. Relative to the problem of heterogeneous session herein above mentioned, it is typically not practical or possible to control what software applications a client puts on a ring or transmission. The customer will typically have applications on a ring which send frames at a predetermined size. Thus it is not feasible to constrain normally the average size frames sent by each station sending frames at a lower priority than the high priority multimedia server.

From the foregoing, it will be apparent that it is necessary to guarantee that multimedia session obtain at least a minimal amount of bandwidth to insure that sound, voice, and video can be delivered within a certain amount of time. On token ring communication networks, a priority scheme is employed for multimedia so that a station can make a reservation in a passing token ring frame and obtain a token after the frame is transmitted. In implementations of the token ring wherein network adapters release the token after each send, a single multimedia server may capture no more than fifty percent of the tokens. If there are file transfers occurring on the ring, each time the server releases the token, a station will capture it to send a data frame. However, if the frame size for the file transfer is equal to the frame size of the multimedia transfer, the server may obtain no more than half the ring bandwidth even when priority is employed. If the file transfer frame size is greater than the multimedia transfer size, the bandwidth allocated to priority multimedia traffic could become arbitrarily small.

It is desirable in such computerized network environments that systems be configurable such that a server, disk, client, transport and network subsystem obtains as much or as little resource reservation as is possible or desired. If the system is needed to support an absolute maximum number of multimedia sessions, such as video sessions, then some means is needed to protect the multimedia flows on the token ring from interference from unreserved traffic, such as normal file system activity. However, data frames on a token ring can typically be as large as 9.1 milliseconds in transfer time, e.g. over 16 Kbytes on a 16 Mbps token ring. Accordingly, it will be readily apparent that some means was needed to insure that data traffic having large frames did not consume more ring bandwidth than the system administrator configured for the multimedia traffic.

SUMMARY OF THE INVENTION

A system and method is provided to complement use of priority for reserved traffic in multimedia computerized data communication networks, to insure that the opportunity for transmitting large, unreserved data frames is constrained. In accordance with a preferred embodiment of the invention, if frames transmitted when the server releases a token tend to be small, then the server will capture a larger portion of the bandwidth, e.g. if the server only obtains fifty percent of the tokens and the remaining stations obtain fifty percent, the server will obtain up to eighty percent of the ring bandwidth if its frames, on average, are nominally four times the size of the lower priority frames.

In accordance with the invention, a short bandwidth reservation acknowledgement is transmitted onto the ring by the client for selected frames which it receives. This bandwidth reservation acknowledgement, however, differs from other communication acknowledgements in that it is not addressed to any station on the ring, but rather is simply transmitted at a non-zero priority less than the server's priority. In a preferred embodiment, the criteria which is employed by the client for such bandwidth reservation acknowledgement is that the sender will send a bandwidth reservation acknowledgement only when the IEEE 802.5 AC field is set, but will do so for a fixed amount of time or for a fixed number of received frames. This criteria provides an optimization reducing overall ring utilization, since the bandwidth reservation acknowledgement is only sent when the ring is congested. Such congestion is deduced from the fact that the server had to make a reservation to receive the token, and the AC field reflects this condition.

In accordance with the foregoing, a communication network is disclosed which transmits an unsolicited acknowledgement at non-zero priority for each non-zero priority frame received, such system thereby being independent of the communication protocol employed by the network station.

DETAILED DESCRIPTION OF THE PREFERRED EMBODIMENT

Figure 1:
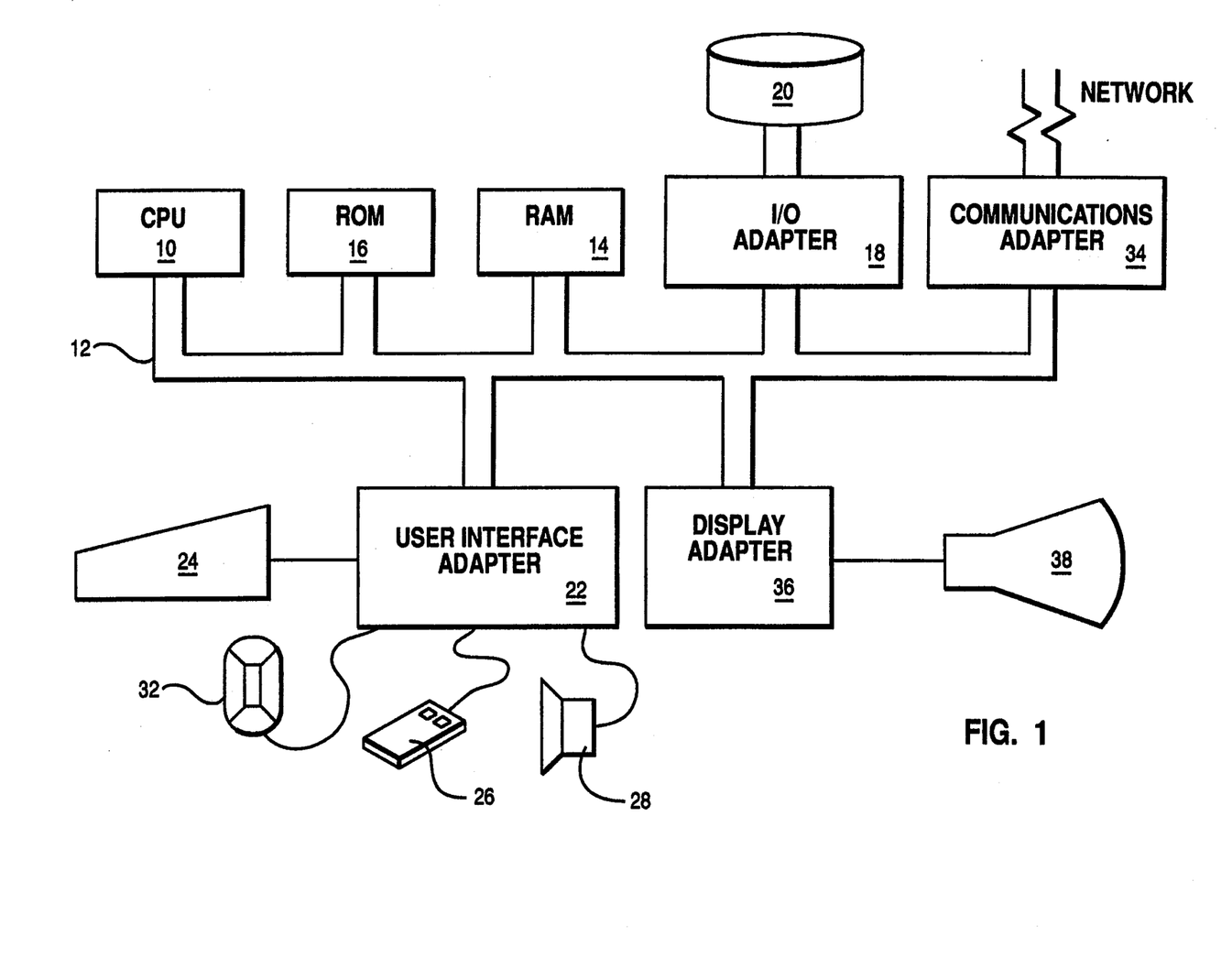
FIG. 1 is block diagram showing the configuration of a typical workstation in accordance with the subject invention.

Referring now to FIG. 1, there is illustrated a typical hardware configuration of a workstation with a central processing unit 10, and a number of other units interconnected via a system bus 12. The workstation shown in FIG. 1 includes a random access memory (RAM) 14, read only memory (ROM) 16, and I/O adapter 18 for connecting peripheral devices such as disk units 20 to the bus, a user interface adapter 22 for connecting a keyboard 24, mouse 26, loudspeaker 28, microphone 32, and/or other user interface devices to the bus, a communication adapter 34, for connecting the workstation to a data processing network, and a display adapter 36 for connecting the bus to a display device 38.

FIG. 1 depicts a typical "intelligent" workstation, however, the workstation may in fact be a "dumb" terminal with only a limited processing capability under control of a host processor. Alternatively, the workstation may be a simple digital device for presenting audio or video streams. This is made clear in connection with FIG. 2.

Figure 2:
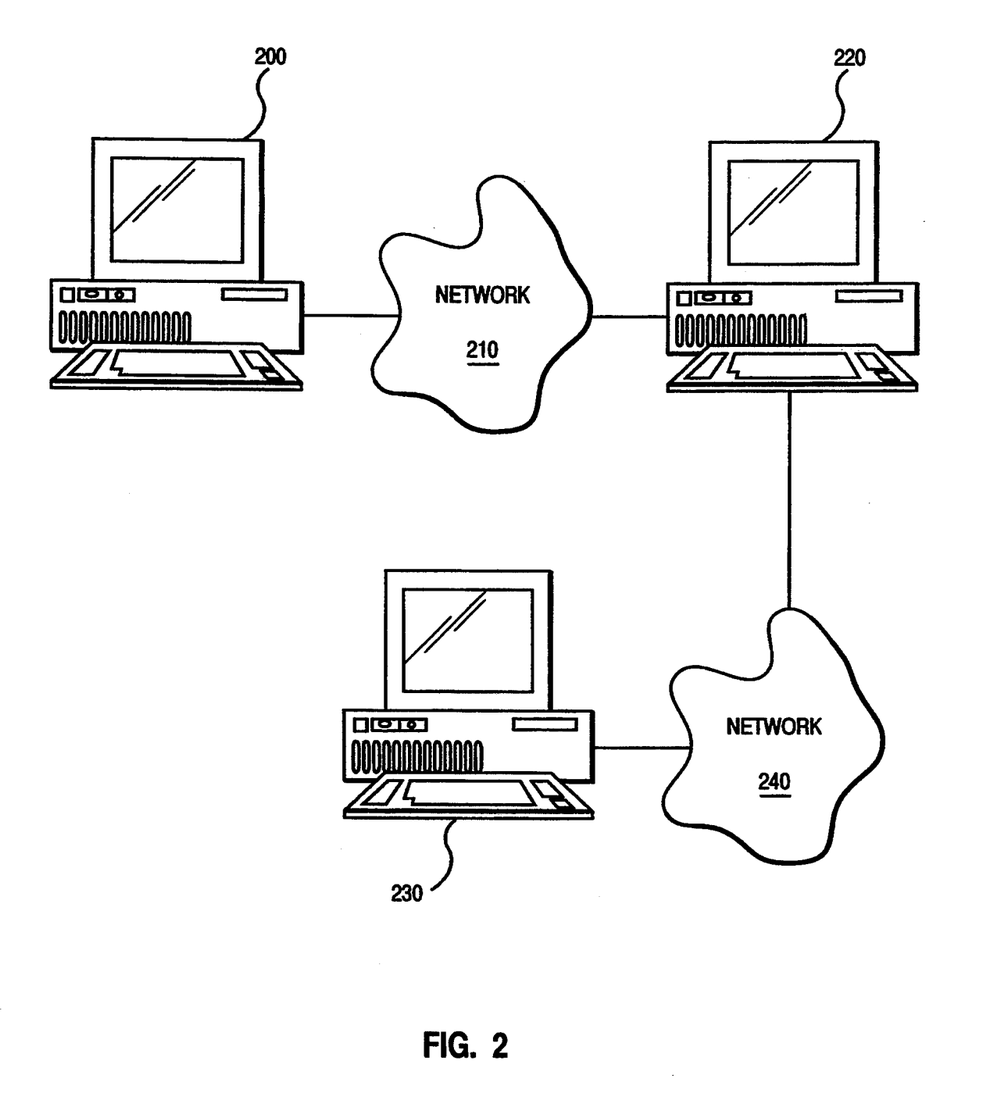
FIG. 2 is an illustration of a data processing system including three workstations interconnected by a network.

FIG. 2 illustrates a data processing system comprising a number of workstations (here, three workstations 200, 220, and 230) interconnected by a pair of data networks 210 and 240, so as to permit communication between the workstations. It is assumed that the data processing system shown in FIG. 2 is of a type which permits concurrent real-time communication between the users. The network operates according to a conventional network protocol, such as the token ring protocol described in *Token Ring Network Architecture* reference, SC30-3374, IBM, 1989.

FIG. 2 depicts only one possible hardware configuration for a data processing network. Other configurations are possible. For example, the data processing system could be based upon a star network, or a host processor connected to a plurality of dumb terminals, or could further be based upon a plurality of remote processors connected by a communication network. The networks could also be based upon a telephone network, an ISDN network, or any other "dial up" networks. Moreover, the workstations could be located within the single workspace or within a local area, or could be remote from one another. A source for detailing technical planning information for configuring a network of workstations in accordance with the invention, is the *IBM Extended Services for OS/2 Example Scenarios Manual*, 1991.

Multimedia computing is the processing of various media, such as video, waveform audio, musical instrument digital interface (MIDI) streams, animation, graphics, and text. Such processing includes the capture, authoring (editing) and playback of media streams as well as other data processing applications. Multimedia documents which are stored on some non-volatile medium, such as a disk, are referred to as recorded multimedia applications. There are also live multimedia applications in which two or more people communicate with each other at the same time using a computer. Live multimedia applications are normally conducted across space and time indicating that live multimedia is inherently distributed. Even recorded multimedia applications require distributed file system services to share large volumes of stored media, such as video disk, audio information, or computer-generated images. Thus, it is critical that a prioritizing scheme in accordance with the invention for multimedia applications includes support for a distributed environment.

To reduce design complexity, most networks are organized as a series of layers, each one built upon its predecessor as described in *Computer Networks,* Tannenbaum, Andrew S., Prentice Hall (1988) and *Model for Computer Communications Standards,* Black, Ulyess, Prentice Hall, 1991. The number of layers, the name of each layer, contents, and function of each layer differ from network to network. However, in each network, the purpose of the layers is to offer certain services to the higher layers, shielding those layers from the details of how the offered services are actually implemented. The purpose, function, and details of each of the layers and their interaction is set forth in the previously noted references and is familiar to communication programmers ordinarily skilled in the art.

The transport layer accepts data from the session layer, splits it up into smaller units and passes the units to the network layer to ensure that the pieces all arrive at the other end. Details of the transport layer and how it fits into the OSI architecture are shown in FIG. 18 of the Tannenbaum book and described in the related pages. A representative of network architecture that provide technical standards documents for the networking framework are *ISO/IEC JTC 1/SC 21 Information Retrieval, Transfer and Management for OSI Secretariat:* USA (ANSI) (3294) *Basic Reference Model Management Framework* (7498-4), and *Management Information Model* (3324) ISO, 1989.

One way of looking at the transport layer is to regard its primary function as enhancing the Quality of Service (QOS) provided by the network layer. QOS can be characterized by a number of specific parameters. The OSI transport service allows a user to specify preferred, acceptable, and unacceptable values for these parameters when a connection is made. Some of these parameters also apply to connection less transports. The transport layer examines the parameters, and depending upon the kind of network services available to it, determines whether the transport layer can provide the necessary service.

Representative QOS parameters and more detail on QOS as it relates to the invention may be obtained in our copending patent application, U.S. Ser. No. 08/085,264, filed Jun. 28, 1993 and entitled "System and Method for Providing Multimedia Quality of Service Sessions in a Communications Network", incorporated herein by reference.

The hereinbefore-noted QOS parameters are specified by a transport application when a connection is requested. Both the desired, minimum, and maximum acceptable values are given. In some cases, the transport layer immediately recognizes that the values are not achievable. When this occurs, the communication attempt fails, and an appropriate exception is noted. In other cases the transport layer knows that it cannot achieve the desired goal, but can achieve a lower, but still acceptable rate. The lower rate, minimum acceptable rate, and maximum acceptable rate are sent to the remote machine requesting the established of a connection. If the remote machine cannot handle the proposed value, but can handle a value above the minimum or below the maximum, then it may lower the parameter to its value. If it cannot handle any value above a minimum, then it rejects the connection attempt. Then, the originating transport application is informed of whether the connection was established or rejected.

This process is called open negotiation. Once the options have been negotiated, they remain that way through the life of the connection. The OSI Transport Service Definition, (ISO 8072) does not specify the QOS parameters. These are normally agreed upon by a carrier and customer. A T-connect request is employed to initialize communication, and the QOS is specified as part of this transactions. Details on the transport primitives are found in the aforementioned reference. Below the transport and network layers are the link or MAC layers in the OSI and IEEE 802 reference models to be hereinafter described. Some MAC protocols, such as synchronous FDDI, provide guarantees for throughput, delay, and delay variation to applications. Other MACs such as the Token Ring and Token Bus have architected priority mechanisms which can support quality of service guarantees (throughput, delay, etc.) when the subject invention is employed.

Priority assurance is an important factor in ensuring QOS, and is enabled by operation of a component which may be implemented in hardware logic or software. The components regulate access to the priority queues or transmit channels that are attached to the shared medium local area network or any point-to-point communications link over copper, fiber, radio or satellite transponders. Access to the priority queue or transmit channels will pass through this component, thus subjecting all communication transactions to rejection or tracking by the component. A more detailed discussion of this component and the related station's bandwidth manager component are described in *Network Priority Management,* U.S. patent application, (AT9-92-089) Ser. No. 07/930,587, filed Aug. 17, 1993.

Figure 3:
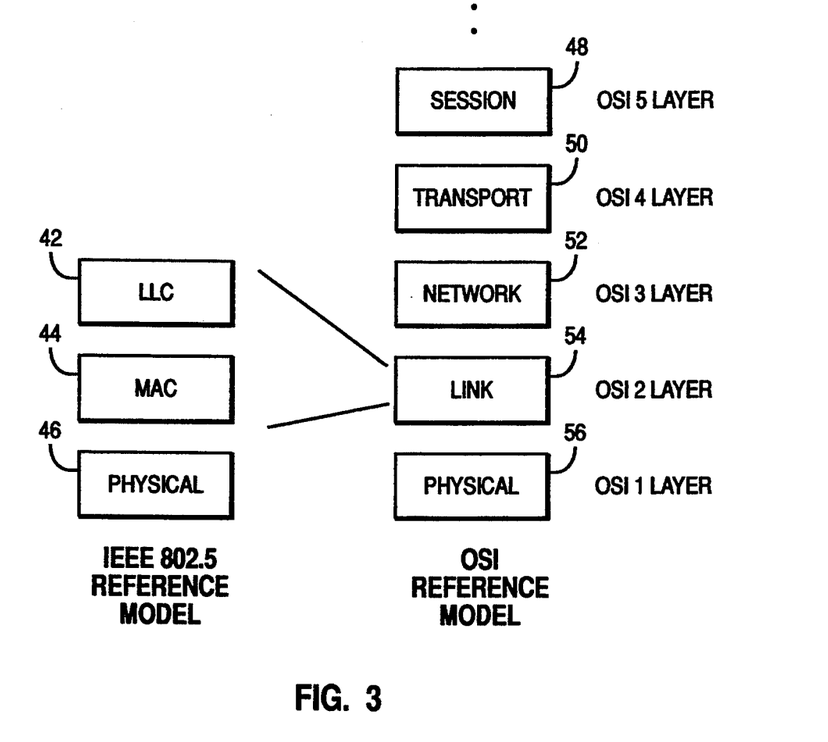
FIG. 3 is a representation of a layered open systems interconnection model showing the relationship of components of the subject invention to the layers.

Turning now to FIG. 3, depicted therein is a schematic representation of two forms of a multilayered computer communication network model based upon the OSI and IEEE layered reference models. Further detail of this OSI and related IEEE models may be found in *OSI, A Model for Computer Communications Standards,* infra. The first five layers of the OSI model are shown in FIG. 3 as reference numerals 40–56. The lowest layer is the physical layer OSI 1, 56, which is responsible for implementing a physical circuit between data terminal equipment and data circuit terminating equipment.

The data link or second layer, OSI 2, 54, is responsible for transfer of data across the link. The third or network layer, OSI 3, 52, specifies the interface of the user into a network and also defines network switching/routing and communications between networks. The fourth or transport layer, OSI 4, 50, provides an interface between the data communications network and the upper three layers. This layer is of particular interest inasmuch as it provides the user options in obtaining certain levels of quality, and is designed to keep the user isolated from some of the physical and functional aspects of the network.

The fifth or session layer, OSI 5, 48, serves as a user interface into the transport layer below, providing a means for exchange of data between users such as simultaneous transmission, alternate transmission, checkpoint procedures and the like. The remaining two layers, the presentation layer and application layer (not depicted), ensure that user applications can communicate with each other and further concern the support of the end-user application process.

It will be noted from FIG. 3 that there are other implementations in the art of such an OSI reference model bearing varying degrees of similarity thereto, a portion of one being depicted in the left part of FIG. 3 as the IEEE model. A physical layer 46 may be seen corresponding to the first layer 56 of the OSI model. The IEEE recognized the need to divide the data link layer OSI 2, 54, into two sublayers in order to handle different link configurations and thus a medium access control (MAC), 44, and logical link control (LLC), 42, were provided for. The MAC sublayer is protocol-specific (such as to a LAN such as Ethernet) whereas the LLC, 42, serves as an interface to an upper layer protocol, typically the network layer (and isolates the network layer from the specific actions of the MAC sublayer). One purpose of depicting varying forms of a multilayered computer communication network in FIG. 3 is to illustrate that the invention admits to implementations in any number of such multilayered models, and is thereby not intended to be limited to application to the OSI reference model emphasized in the description herein.

Figure 4:
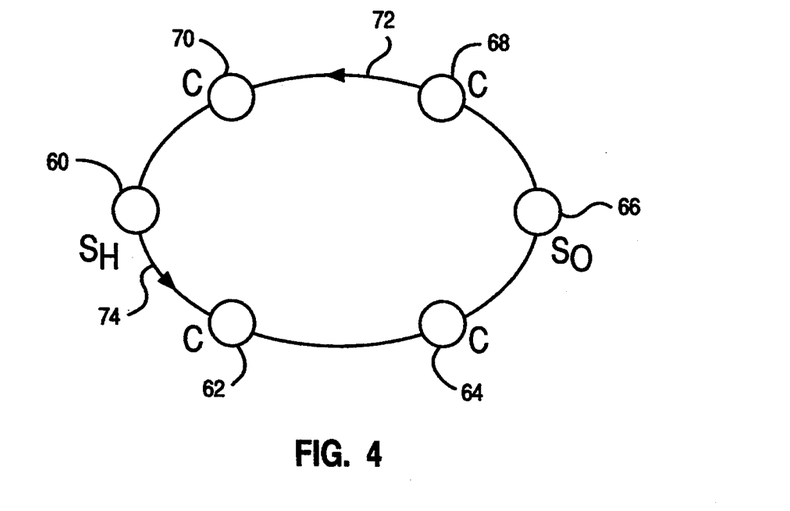
FIG. 4 is a simplified schematic illustration of a workstation network employing multiple servers and clients in a token ring configuration.

FIG. 4 illustrates a typical token ring configuration of a network which, for illustrative purposes, may include a high priority server $S_H$, 60, another server $S_O$, 66, and a plurality of clients on the ring, 62, 64, 68, and 70. In such an arrangement, it will be recalled that it is a significant feature and objective of the invention to provide for reserved bandwidth of multimedia data such that it is not unduly interrupted by acknowledgements from the clients rendering it impossible to provide the needed multimedia flow guarantees. As will become more apparent from the following discussion, it is a significant aspect of the invention that the server or transmitter 60 periodically send out priority frames 74 and the clients or receivers periodically send out acknowledgements addressed to no station or ring, 72.

There is a rule well known in the art which essentially states that forms of token ring adapters, such as the aforementioned IBM token ring, may not capture more than fifty percent of the tokens when there is contention for the token on the ring. Experimental data has shown that the single multimedia server 60 often cannot reserve fifty percent of the bandwidth when there are one or more active data sources on the ring. This is particularly true when the data sources, such as the clients, are using large frame sizes, e.g. typically at or above 4 Kbytes. This phenomenon may be explained and understood by the following expression derived from the aforementioned fifty percent rule:

$$S_H = P/(P+D)$$

where $S_H$ is the maximum proportion of the ring bandwidth that a single priority server can reserve, P is the average size frame sent by that server, and D is the average size frame sent by the stations (which include clients and other servers) that are sending frames at a lower priority than the $S_H$ server.

As a practical example of the problem addressed by the invention, if P is 16 Kbytes (e.g. the average size frame sent by the high priority multimedia server $S_H$, 60, and D is also 16 Kbytes (e.g. the average size frame sent by the remaining clients and/or server $S_O$, then the maximum proportion of ring bandwidth available to $S_H$ is 16/(16+16), e.g. fifty percent.

On the other hand, if D could be reduced to 4 Kbytes, then the proportion of the ring bandwidth reserved by $S_H$ would rise to the desired 75-80 percent level, i.e. $S_H = 16/(16+4)$.

Thus, according to the foregoing, to increase the amount of reservable bandwidth for a single multimedia server, it is apparent we must either increase P or decrease D. However, even if P is increased to 16 Kbytes, a corresponding increase in D would reproduce the problem just described of insufficient ring bandwidth being obtained by $S_H$, e.g. the server once again would only obtain half of the network bandwidth.

It is a feature of the invention, in providing a bandwidth reservation acknowledgement or "ack" to effect this hard guarantee for reservable bandwidth on a token ring whereby the average size of the frames sent by the stations D, is reduced. If a client C, 62-64, 68-70, responds to each priority frame received which was sent by the high priority server 60 (represented as arrow 74 and sends these responses at non-zero priority, then the server will be able to reserve more than fifty percent of the bandwidth for multimedia traffic. It will again be noted that in accordance with the invention, the client responses are sent to no station in the network. The reason that this ack does not go back to the server is that this would cause many unnecessary interrupts in the server. What the bandwidth reservation ack of the invention does is effectively reduce "D" since the responses are small, e.g. 64 bytes. Moreover, since they are at a lower priority than the frames sent by the multimedia server, they obtain the token before zero priority frames, and they thereby occur during the time when the multimedia server is bursting multimedia frames. Accordingly, the server will be able to send a frame (e.g. 4 Kbyte or greater), release the token for a 64 byte non-zero priority frame, and then capture it again to send out another multimedia frame.

It will thereby be apparent, in accordance with the invention, that the 64 byte frames sent by the clients prevent $S_O$ from obtaining the token and bringing the average D down. The invention thus prevents clients from accessing the ring at every opportunity to do so due to their higher priority status. In this manner the invention constrains the $S_O'$ ability to send and not its frame size. By driving the average D down, the resulting $S_O$ average is raised.

In summary, in accordance with the invention a short 64 byte or the like bandwidth reservation acknowledgement is transmitted by clients onto the ring for selected frames which the particular client receives. Such a bandwidth acknowledgement, however, is unlike other communication acknowledgements, however, in that it is not addressed to any station on the ring. It simply transmits a non-zero priority less than the server $S_H'$ s priority. In order to understand how the foregoing is accomplished, reference is now made to FIG. 5, which is an illustration of the media access control (MAC) frame format.

Figure 5:
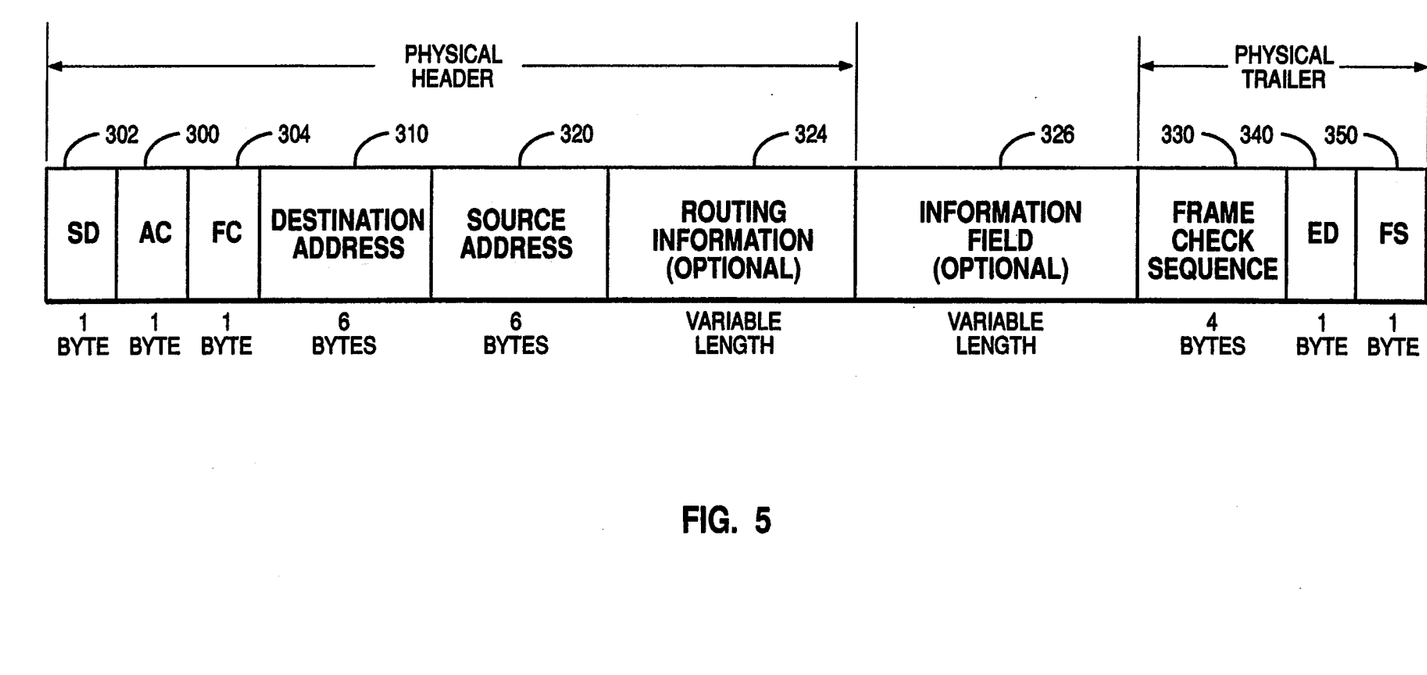
FIG. 5 illustrates the fields of a typical token ring frame.
Figure 6A:
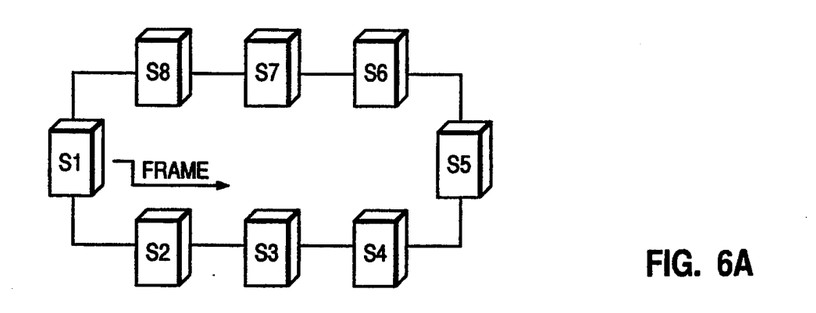
FIGS. 6A-D illustrate priority reservation occurring on a token ring in accordance with the subject invention.
Figure 6B:
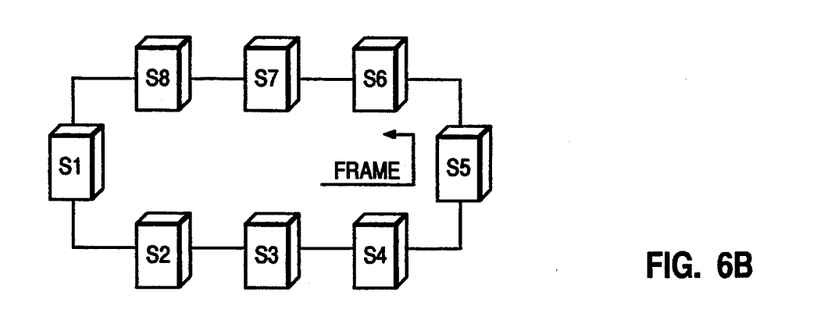
Figure 6C:
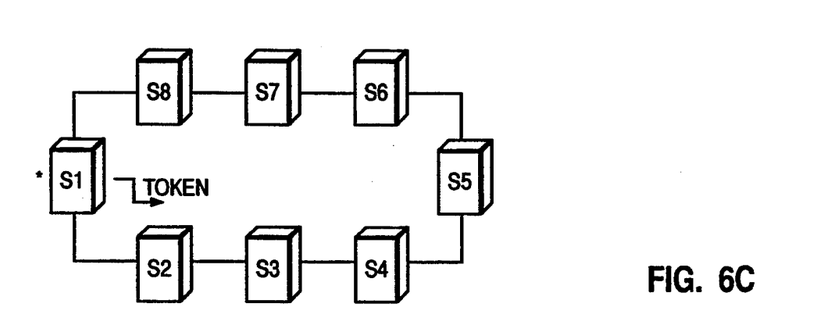
Figure 6D:
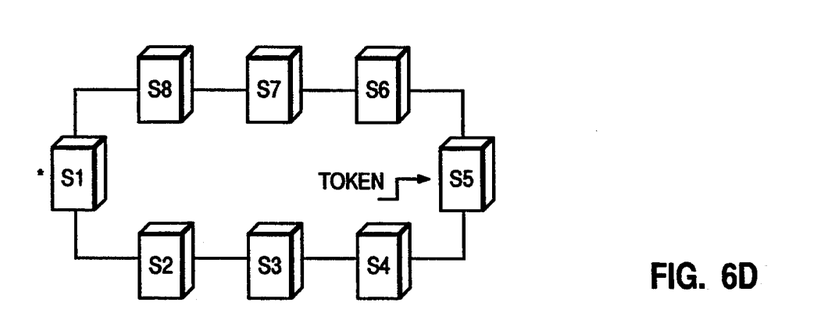

FIG. 5 illustrates the fields of the token ring frame. The AC field 300 is the access control where a workstation may set a value in the passing frame in order to reserve the token when it is released by the sending station after its frame traverses the ring exactly once. Access priority is not the same as message priority within a node. The priority of a token or frame is indicated in the first three bits of the access control field. Any reservation for a different priority is indicated in the last three bits of the same field. A ring station uses the reservation bits to request that a token originated on the ring be at the requested priority.

A ring station can transmit a frame at a given priority using any available token with a priority less than or equal to that of the frame. If an appropriate token is not available, the ring station may reserve a token of the required priority in a passing token or frame as follows:

if another ring station has reserved an equal or higher priority, then the ring station cannot make a reservation in the frame or token.

if the reservation bits have not been set, or if they have been set to a lower priority than that required by the ring station, it sets the reservation bits to its required priority.

The starting delimiter (SD) 302 is a single byte indicative of the starting delimiter of the transmitted communication buffer. All valid frames and tokens start with this byte. FC 304 is the frame control field, ED 340 is the ending delimiter, and FS 350 is the frame status field. The destination address 310 is the address for delivery of the communication buffer. The source address 320 is the originating address of the communication buffer. The information field 326 is included for optional delivery information or other communication information. The frame check sequence 326 covers the frame control field, the destination and source addresses, the optional routing information field, the information field and the frame check sequence.

FIG. 4A–D illustrates the reservation process on a token ring in accordance with the subject invention. A station may reserve a future token at a certain priority, and the token priority can be increased and reset to its original value. Moreover, the use of priority by individual stations for transmitting frames is unconstrained. If all stations transmitted all frames at a given priority, there would be no change in the functioning of the ring. And if access to priority transmission is not regulated, there will be no way to guarantee a certain throughput rate, nor bound the amount of time it will take for a station having a priority frame to gain access to the ring.

Now that a description has been provided of the access control and frame control fields of a typical token ring frame, criteria of different implementations of the invention may now be better understood which may be used by the clients for bandwidth reservation acks. In a first embodiment, when a frame is received from the server which, for example, has an IEEE 802.5 FC field set greater than 1, the client will send a bandwidth reservation ack at a priority less than the priority of the received frame.

In a second embodiment, whenever a frame is received which has an IEEE 802.5 AC field set greater than 1, the client will send at a priority less than the received frame. It will be noted that the priority of the received frame is set in the FC field of the frame, the AC field being equal to the priority of the token which the sender captured.

In yet a third embodiment, the sender, as in the latter case, will preferably transmit a bandwidth reservation ack only when the AC field is set, but will do so either for a fixed amount of time or for a fixed number of received frames.

In summary, in accordance with the invention's system for bandwidth reservation acks for token ring multimedia, a communication system may be seen to have been provided which transmits unsolicited acknowledgements at non-zero priority for each non-zero priority frame received. The system is accordingly independent of the communication protocol. In one embodiment, each non-zero priority frame is sent in response to receipt of a non-zero priority frame and is addressed to no frame on the network. In another embodiment, the number of non-zero priority frames sent in response to receipt of a non-zero priority is configurable. In a further embodiment, the size of the non-zero priority frames sent in response to receipt of a non-zero priority frame is configurable.

Figure 7:
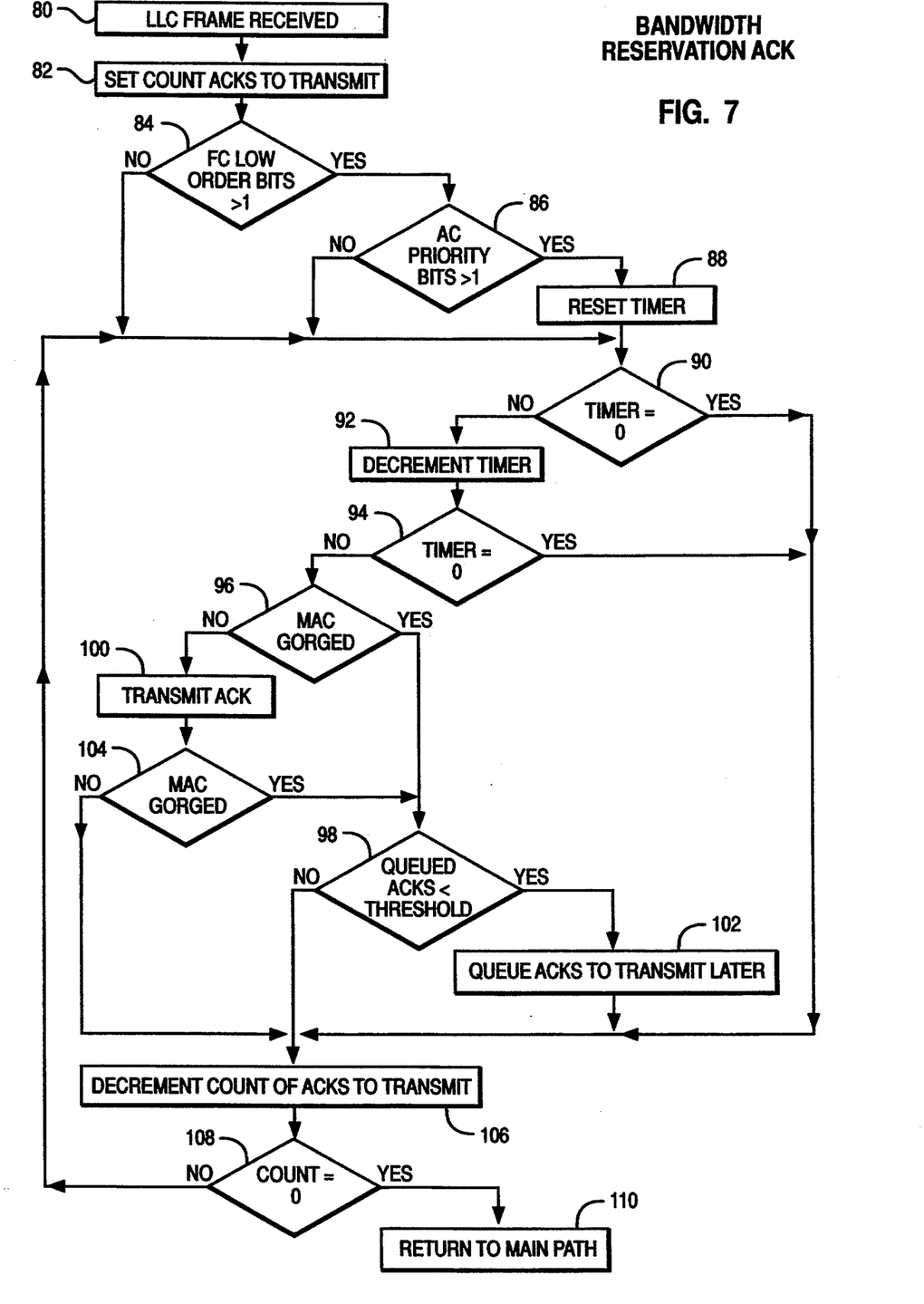
FIG. 7 is a flow diagram detailing the program logic in accordance with the subject invention.

Turning now to FIG. 7, a representative flow diagram is provided which represents a computer program which may be employed by the system to effect the objects of the invention. First, when a logical link control (LCC) frame is received, 80, a count of the acks to transmit is set, 82. Next, a determination is made from the LCC frame as to what the frame's priority is, e.g. the FC field is inspected to determine if the low order bits are greater than 1, 84. If so, the AC field is checked to determine if its priority bits are greater than 1. If so, a timer is reset, 88. A check is then made of whether the timer value is 0. It will be noted that if the FC low order bits or AC priority bits are not greater than 1, the timer will be polled to see if it is equal to 0, 90. If the timer, per the check at reference numeral 90, is equal to 0, the count of the acks to transmit (set at block 82), will be decremented at block 106, whereupon a check will be made of whether the count has reached 0, 108. If so, a return will be made to the main transmission network flow path, 110.

If the count has not reached 0, 108, control loops back again to check whether the timer value is equal to 0, 90. If at any time the timer is detected as not being set to 0, it will be decremented, 92, and then checked again for 0, 94. If the timer has reached 0, the aforementioned decrementing of the ack count will occur, 106, followed by the steps previously described. If, on the other hand, after decrementing the timer a check indicates it is not equal to zero, 94, then a check will be made to determine if the media access control (MAC) is "gorged".

This occurs when too many transmissions have been queued up, and relates to the fact that a typical token ring adapter may accept only a predetermined number of frames at a given time. If an attempt is made to provide more than the threshold number of frames for transmission, they will be rejected. Accordingly, this step is implemented to determine if the number of acks which have been queued exceed a threshold. If so, the sending of acks is suspended for a period, whereas if not, they are queued for later transmission.

Continuing with FIG. 7, with the foregoing in mind, if the MAC is not gorged, the ack is transmitted, 100, a check is made again of whether the MAC is gorged, and if not, the count of the acks to transmit is decremented, 106, and flow continues as previously described. If, on the other hand, in response to a check of whether the MAC is gorged at 104 the response is affirmative, control block 98 is entered checking to see if the queued acks are less than the predetermined threshold, whereupon again processing continues as previously described. Similarly, in response to the first check to determine whether the MAC was gorged, 96, if so, again the check at block 98 will be made to determine if the queued acks are less than the threshold. It will be noted that in the first case described previously when the priority message is sent (e.g. the FC field is set) and no contention exists on the ring, an ack is sent. In the second case, an ack is sent only when the priority indicator is set, indicating or suggesting contention on the ring. Finally, in the third embodiment, similar to the second case, an ack will be sent when the priority indicator indicates contention on the ring, but it will only be sent for a period of time and then stop, as indicated by the previously described flow diagram.

While the invention has been shown and described with reference to particular embodiments thereof, it will be understood by those skilled in the art that the foregoing and other changes in form and detail may be made therein without departing from the spirit and scope of the invention.

We claim:

1. A method for use in a digital communications multi-station ring network employing at least one ring token and having at least one server transmitting server frames at a predetermined priority and a plurality of client stations, comprising generating unrequested bandwidth reservation acknowledgement frames by one of said client stations;

transmitting, by said one of said client stations, said acknowledgement frames onto said ring at a non-zero priority less than said predetermined to and received by no said client stations on said ring; and inhibiting said server from transmitting a request for or confirmation of said acknowledgement frames.

2. The method of claim 1 wherein said transmitted acknowledgement frames are unsolicited.

3. The method of claim 2 wherein said server frames are comprised of multimedia data.

4. The method of claim 1 wherein each of said server frames is received by said one of said client stations, and each of said acknowledgement frames is transmitted by said one of said client stations in response to said each of said server frames received.

5. The method of claim 4 wherein said each of said acknowledgement frames is addressed to no said client station on said ring.

6. The method of claim 5 wherein the total of each of said acknowledgement frames transmitted by said one of said client stations in response to said each of said server frames received is configurable.

7. The method of claim 5 wherein the size of each of said acknowledgement frames transmitted by said one of said client stations in response to said server each of said frames received is configurable.

8. The method of claim 1 wherein each of said acknowledgement frames is transmitted only when said ring is congested.

9. The method of claim 1 wherein each of said acknowledgement frames is transmitted only when access control fields of corresponding server frames transmitted by said at least one server are set, and wherein said transmitting of each of said acknowledgement frames is for a predetermined amount of time or for a predetermined number of server frames received by said one of said client stations.

10. The method of claim 9 wherein said server frames transmitted by said server are multimedia frames; and wherein said ring token is retained, in order, by said at least one server while said server is transmitting said multimedia frames, by said one of said client stations during said transmitting of said acknowledgement frames, and by said server during a next transmission of said multimedia frames.

11. Apparatus for use in a digital communications multi-station ring network employing at least one ring token and having at least one server transmitting server frames at a predetermined priority and a plurality of client stations, comprising means for generating unrequested bandwidth reservation acknowledgement frames by one of said client stations; and means for transmitting, by said one of said client stations, said acknowledgement frames onto said ring at a non-zero priority less than said predetermined priority, said acknowledgement frames being addressed to no said client stations on said ring; and means for inhibiting said server from transmitting a request for or confirmation of said acknowledgement frames.

12. The apparatus of claim 11 wherein said transmitted acknowledgement frames are unsolicited.

13. The apparatus of claim 12 wherein said server frames are comprised of multimedia data.

14. The apparatus of claim 11 wherein each of said server frames is received by said one of said client stations, and each of said acknowledgement frames is transmitted by said one, of said client stations in response to said each of said frames received.

15. The apparatus of claim 14 wherein said each of said acknowledgement frames is addressed to no said client station on said ring.

16. The apparatus of claim 15 including means for configuring the number of said acknowledgement frames transmitted by said one of said client stations in response to said each of said server frames received.

17. The apparatus of claim 16 including means for configuring the size of said acknowledgement frames transmitted by said one of said client stations in response to said each of said server frames received.

18. The apparatus of claim 11 wherein said means for transmitting transmits said acknowledgement frames only when said ring is congested.

19. The apparatus of claim 11 wherein said means for transmitting transmits said acknowledgement frames only when access control fields of corresponding server frames transmitted by said at least one server are set, and wherein said means for transmitting transmits said acknowledgement frames for a predetermined amount of time or for a predetermined number of server frames received by said one of said client stations.

20. The apparatus of claim 19 wherein said server frames transmitted by said server are multimedia frames; and wherein said apparatus further includes means for retaining said ring token by said at least one server while said server is transmitting said multimedia frames, by said one of said client stations during said transmitting of said acknowledgement frame, and by said server during a next transmission of said multimedia frames.

* * * * *

UNITED STATES PATENT AND TRADEMARK OFFICE
CERTIFICATE OF CORRECTION

PATENT NO.   : 5,388,097
DATED        : February 7, 1995
INVENTOR(S)  : M. J. Baugher, et. al.

It is certified that error appears in the above-indentified patent and that said Letters Patent is hereby corrected as shown below:

Column 5, line 6, after "and" insert --OSI, A--;
Column 11, line 20, after "predetermined" insert --priority, said acknowledgment frames being addressed --; and Column 12, line 27, delete "one," and insert --one--.

Signed and Sealed this

Fourth Day of June, 1996

Attest:

BRUCE LEHMAN

*Attesting Officer*    *Commissioner of Patents and Trademarks*